(12) United States Patent
Kapahi

(10) Patent No.: US 9,304,666 B2
(45) Date of Patent: Apr. 5, 2016

(54) SUPPORTING NAVIGATION ON TOUCH SCREENS DISPLAYING ELEMENTS ORGANIZED IN A FIXED NUMBER OF DIMENSIONS

(71) Applicant: Oracle International Corporation, Redwood Shores, CA (US)

(72) Inventor: Puneet Kapahi, New Delhi (IN)

(73) Assignee: Oracle International Corporation, Redwood Shores, CA (US)

( * ) Notice: Subject to any disclaimer, the term of this patent is extended or adjusted under 35 U.S.C. 154(b) by 159 days.

(21) Appl. No.: 14/097,263

(22) Filed: Dec. 5, 2013

(65) Prior Publication Data

US 2014/0380245 A1    Dec. 25, 2014

(30) Foreign Application Priority Data

Jun. 24, 2013  (IN) .............................. 2761/CHE/2013

(51) Int. Cl.
*G06F 3/048* (2013.01)
*G06F 3/0484* (2013.01)
*G06F 3/0488* (2013.01)

(52) U.S. Cl.
CPC .......... *G06F 3/04842* (2013.01); *G06F 3/0488* (2013.01)

(58) Field of Classification Search
CPC ........................... G06F 3/04842; G06F 3/0488
See application file for complete search history.

(56) References Cited

U.S. PATENT DOCUMENTS

| | | | | |
|---|---|---|---|---|
| 6,075,536 | A * | 6/2000 | Kunieda et al. | 715/848 |
| 7,055,109 | B2 * | 5/2006 | Boden et al. | 715/854 |
| 8,099,674 | B2 * | 1/2012 | Mackinlay et al. | 715/764 |
| 8,751,943 | B1 * | 6/2014 | Petrovich | 715/753 |
| 2008/0235788 | A1 * | 9/2008 | El Saddik et al. | 726/18 |
| 2009/0089714 | A1 * | 4/2009 | Blake et al. | 715/850 |
| 2010/0251151 | A1 * | 9/2010 | Alsbury et al. | 715/765 |
| 2011/0078624 | A1 * | 3/2011 | Missig et al. | 715/802 |
| 2011/0080351 | A1 * | 4/2011 | Wikkerink et al. | 345/173 |
| 2011/0291945 | A1 * | 12/2011 | Ewing et al. | 345/173 |
| 2012/0030623 | A1 * | 2/2012 | Hoellwarth | 715/811 |
| 2014/0129985 | A1 * | 5/2014 | Morozov et al. | 715/823 |
| 2014/0304577 | A1 * | 10/2014 | St. Pierre et al. | 715/201 |

* cited by examiner

*Primary Examiner* — Omar Abdul-Ali
(74) *Attorney, Agent, or Firm* — IPHorizons PLLC; Narendra Reddy Thappeta

(57) ABSTRACT

An aspect of the present disclosure stores information related to the elements in the form of an array of objects. Each object contains information indicating the area covered by the object on the display. The index values used for accessing an element may be viewed as forming an N-tuple, with each value of the N-tuple representing the value of the corresponding dimension/index. A swipe is first mapped to a single one of the dimensions and an end position along the dimension. The value of the tuple corresponding to only the dimension is modified and the object corresponding to the tuple is accessed. The area information in the accessed object is examined to determine whether the end position of swipe falls in the display area covered by the element. The tuple value of only the dimension is modified in searching for the element that covers the end position.

18 Claims, 11 Drawing Sheets

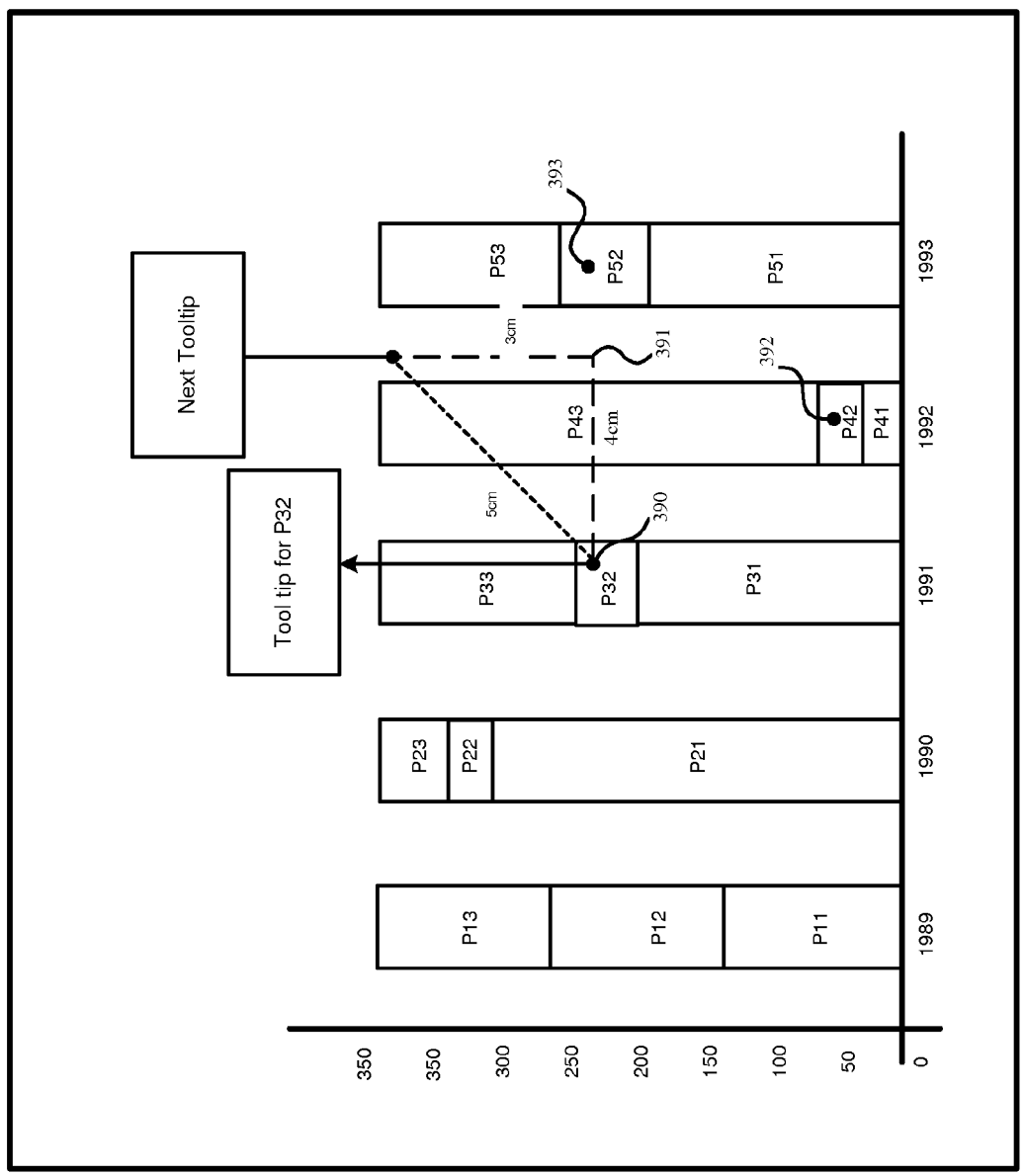

SUPPORTING NAVIGATION ON TOUCH SCREENS DISPLAYING ELEMENTS ORGANIZED IN A FIXED NUMBER OF DIMENSIONS

PRIORITY CLAIM

The instant patent application is related to and claims priority from the co-pending India patent application entitled, "Supporting Navigation On Touch Screens Displaying Elements Organized In A Fixed Number Of Dimensions", Serial No.: 2761/CHE/2013, Filed: 24 Jun. 2013, which is incorporated in its entirety herewith.

RELATED APPLICATIONS

The instant patent application is related to the following patent applications, which are all herewith incorporated in their entirety to the extent not inconsistent with the disclosure of the instant patent application:

1. entitled, "DISPLAYING TOOLTIPS TO USERS OF TOUCH SCREENS", Application Number: UNNASSIGNED, filed on: HEREWITH, First Named Inventor: Puneet Kapahi;

2. entitled, "FACILITATING TOUCH SCREEN USERS TO SELECT ELEMENTS IN A DENSELY POPULATED DISPLAY", Application Number: UNNASSIGNED, filed on: HEREWITH, First Named Inventor: Puneet Kapahi;

3. entitled, "FACILITATING TOUCH SCREEN USERS TO SELECT ELEMENTS IDENTIFIED IN A TWO DIMENSIONAL SPACE", Application Number: UNNASSIGNED, filed on: HEREWITH, First Named Inventor: Puneet Kapahi; and 4. entitled, "DISPLAYING INTERACTIVE CHARTS ON DEVICES WITH LIMITED RESOURCES", Application Number: UNNASSIGNED, filed on: HEREWITH, First Named Inventor: Puneet Kapahi.

BACKGROUND OF THE DISCLOSURE

1. Technical Field

The present disclosure relates to touch screen based systems, and more specifically to supporting navigation of visual elements organized in a fixed number of dimensions in such systems.

2. Related Art

A touch screen refers to a display screen, which responds to touch based operations (e.g., touch/tap, drag, swipe, pinch) of users using one or more fingers, stylus, etc., and facilitates user interfaces with applications based on the operations.

The displays on touch screens often contain various elements. An element refers to a distinct entity (e.g., an icon, hyperlink, graphics element, etc.) that is usually visually demarcated by appropriate visual attribute (e.g., color, texture, border lines) on the display.

Displays are often populated with elements identified in a fixed number of dimensions. A two dimensional matrix, with each entry at the intersection of a row and a column, being one of the elements, is an example of such an organization. However, elements can be identified in more dimensions (e.g., 3 or 4), without such clear correlation in display. An example of such a display is a stacked bar graph, in which the same measures (e.g., profits from 3 different segments in one dimension) are displayed for multiple time points (e.g., annually for several years).

Users often wish to navigate across different displayed elements. Navigation generally entails selection of a next element, after having interacted with a present element. In general, such navigation is required to be convenient for the user.

BRIEF DESCRIPTION OF THE DRAWINGS

Example embodiments of the present disclosure will be described with reference to the accompanying drawings briefly described below.

FIGS. 3A-3F represent respective displays on a touch screen illustrating the selection and display of tooltip information.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Overview

Figure 1:
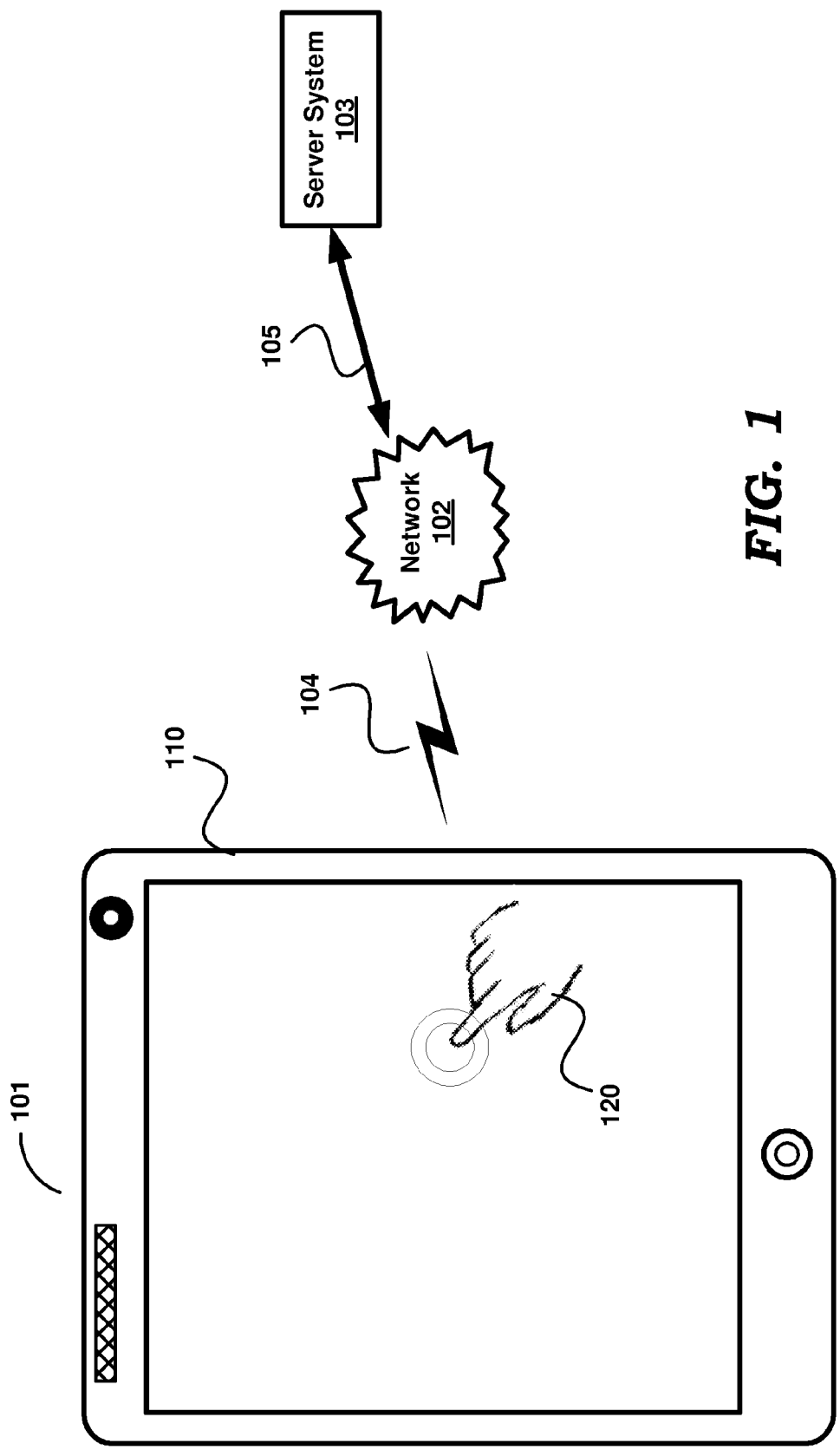
FIG. 1 is a block diagram illustrating an example computing system in which several aspects of the present disclosure can be implemented.

An aspect of the present disclosure stores information related to the elements in the form of an array having a same number (N) of dimensions as the number of dimensions the elements are organized in. In an embodiment, the information for each element is stored as a corresponding object such that the array is an array of objects, with each object being addressable by the values of respective index (of the N indices). Each object contains information indicating the area covered by the object on the display.

The index values used for accessing an element may be viewed as forming an N-tuple, with each component of the N-tuple representing the value of the corresponding dimension/index for accessing the element in the array. As a user navigates, for example by a swipe, the swipe is first mapped to a single one of the dimensions (including direction).

According to an aspect, the next element (from the current selected element) along the dimension is selected as a next selected element, irrespective of distance of swipe, etc. Thus, only the component matching the dimension, needs to be modified to reflect the next selected element. As a result, the next selected element can be determined with reduced complexity, however, the movement (for selection) is limited to a single element in the direction of the swap.

According to another aspect, an end position of the swipe is also determined based on the swipe. The end position may be represented, for example, as a coordinate value in the space in which the elements are also represented. The objects along the dimension are searched to determine a proximal element (e.g., one having a display area covering the end position) to the end position, with the proximal element thereafter being deemed to be the next selected element. The search may entail changing the tuple component corresponding to a single dimension, and searching relatively fewer objects since only the objects along the dimension are searched/examined.

In an embodiment, the object stores tooltip information, which is displayed associated with each element in the duration the element is deemed selected. By having an array of objects and limiting the navigation direction to one of the dimensions only, the new element selected may be quickly selected, and tooltip information easily retrieved, thereby leading to a user-friendly interface.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

2. Example Environment

FIG. 1 is a block diagram illustrating the details of an example environment in which several features of the present disclosure can be implemented. The environment is shown containing touch system 101, network 102, and server system 103. Each block is described below in further detail.

Network 102 provides connectivity between touch system 101 and server system 103. Merely for illustration, touch system is shown communicating over wireless path 104, and server system 103 using a wire-based path 105. However, each system 101/103 can have the ability to communicate based on wireless and/or wire-based paths.

Server system 103 implements various applications, that forms the basis for interaction with touch system 101. Server system 103 may send data to touch system 101, representing various elements, to facilitate such interaction. Tool tip information corresponding to such elements may also be sent as a part of such data. In an embodiment, server system 103 sends a raster image representing the image to be displayed, an area map identifying the specific display portions which are interactive (i.e., can be selected), and the tool tip information corresponding to each interactive portion (i.e., element) as described in co-pending patent application entitled, "Displaying Interactive Charts On Devices With Limited Resources", naming the same inventor as the subject patent application, and filed on even date herewith.

Touch system 101 provides user interfaces based on touch screens. Touch system 101 may implement either stand-alone applications or networked applications (i.e., as a client side complementing the server side implementation on server system 103). The networked applications can be as simple as a web browser (with appropriate plug-ins) or a custom application such as a mobile application. Touch system 101 may for example correspond to a personal digital assistant (PDA), a mobile phone, etc. A user is shown performing a touch operation on touch screen 110 using finger 120. As noted above, touch operations can be performed using one or more fingers, stylus, etc.

Touch screen 110 is used for displaying various elements. An element is represented by a portion of a display, visually identifiable as a separate entity in its display context. Examples of elements include various graphical icons, interface elements (buttons, scrollbars, etc.), etc, normally generated by the operation of various user applications (e.g., word processors, spread sheets, custom business applications, etc.) or shared utilities (e.g., operating system).

There are often situations when the elements are organized in a fixed number of dimensions. Touch system 103, provided according to several aspects of the present disclosure supports navigation of visual elements organized in a fixed number of dimensions, as described below with examples.

3. Navigation

Figure 2A:
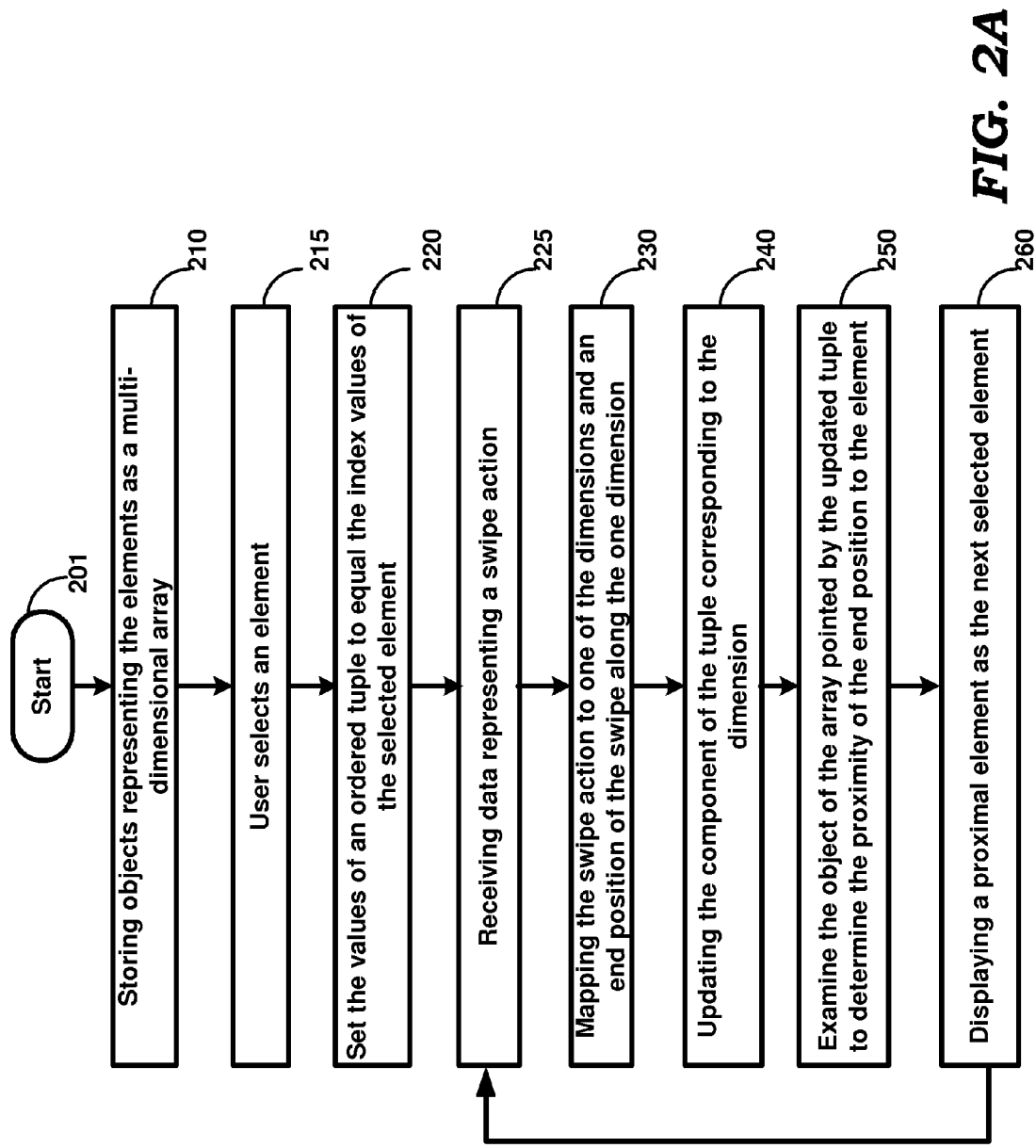
FIG. 2A is a flow chart illustrating the manner in which navigation is supported on touch screens displaying elements organized in a fixed number of dimensions, in an embodiment.

FIG. 2A is a flowchart depicting the manner in which navigation is supported on touch screens according to an aspect of the present disclosure. The flowchart is described with respect to touch system 101 of FIG. 1 merely for illustration. However, the features can be implemented in other systems and environments also without departing from the scope and spirit of various aspects of the present invention, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present invention. The flow chart begins in step 201, in which control immediately passes to step 210.

In step 210, objects representing the elements are stored as a multi-dimensional array within touch system 101. Each object may store data indicating the display area covered by corresponding element and the array may have the same dimensions as the organization of the underlying elements. The information may be based on the data received from server system 103 briefly described above.

In step 215, data indicating selection of an element by a user is received within touch system 101. Normally such selection is performed by users using input devices such as pointer devices by an appropriate touch/tap operation on a display area covered by the element. Coordinates of such touch/tap operation are received by software modules operative in touch system 101, which maps the coordinates to the element.

In step 220, the values of an ordered tuple are set to equal the index values of the selected element within touch system 101. The tuple contains the same number of components as the number of dimensions of the array (or specifically, the number of dimensions in which the visual elements are organized on the display). An 'ordered' tuple implies that each component is tied to a corresponding dimension of the array. Thus, assuming that elements are displayed in a three dimensional form, and a element at position (3, 5, 2) is selected, the tuple may also be set to {3, 5, 2} to represent the current selection.

In step 225, data representing a swipe action is received within touch system 101. The swipe action may be characterized by specific touch points traversed by the swipe action along with the corresponding time instances, or alternatively represented by more compact notations (such as vector and speed) or information (merely sequence of touch points). Various such alternatives will be apparent to a skilled practitioner by reading the disclosure provided herein.

In step 230, the swipe action is mapped within touch system 101 to one of the dimensions and an end position of the swipe along the one dimension. While the description of below is based on correlation of direction of swipe to the display of the corresponding dimension, alternative conventions, as suitable in corresponding environments can also be employed. Similarly, the end position of the swipe is described as being based on the distance of swipe, though alternative conventions can be employed to map other characteristics (e.g., distance of end position being proportionate to speed of swipe) to determine the end position.

In step 250, a proximal element to the end position, among the elements along the dimension, are identified. A proximal element is one, which is closest to the end position. If an object indicates that the display area of an examined element covers the end position, such an element is considered the proximal element. In case such an element does not exist, according to a convention, an element having a center with minimal distance (among other examined elements) is considered a proximal element.

In step 260, touch system 101 displays the proximal element as the next selected element. It should be appreciated that examination of only the elements along the determined dimension (as opposed to in several directions, potentially) reduces the computational complexity in determining the next selected position. Thus, the change of selection can be displayed quickly.

The loop of steps 225-260 may be performed for each subsequent swipe action.

Figure 2B:
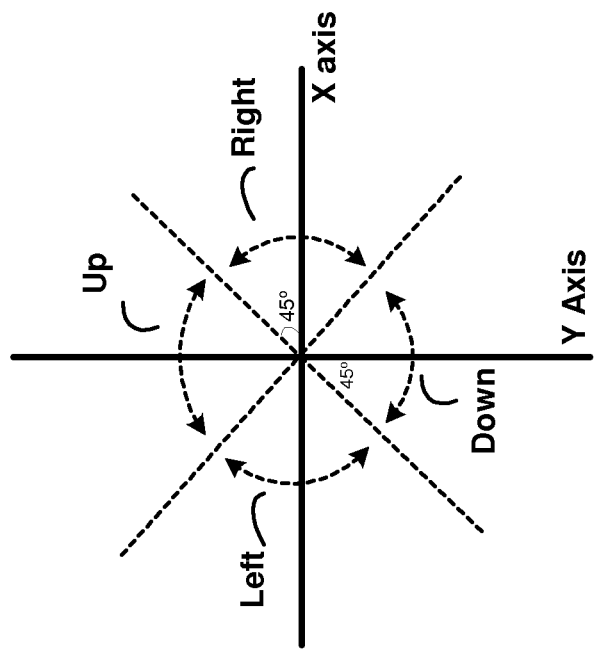
FIG. 2B is a diagram illustrating the manner in which the swipe direction determines the next desired element (relative to a presently selected element) in an embodiment.

In an embodiment, the elements are organized in two dimension and the elements may be displayed along two axis—horizontal and vertical. In such a case, as depicted in FIG. 2B, a swipe at an angle in the range of 315-45, 45-135, 135-225, 225-315 degrees is respectively determined to be horizontal-right, vertical-up, horizontal-left, and vertical-down directions, for the purpose of selection of the next desired element.

Thus, each element (corresponding information) is identified in the form of a two dimensional array and the indices of the accessed element is represented as a two-tuple. As a user navigates across the displayed element, only one of the values of the tuple is changed for each new selection. Due to the use of such an array and constraining the movement for each selection along a single dimension, the information for each selected element may be quickly accessed and used.

The above noted approaches and some other features of the present disclosure are illustrated below with respect to various examples.

4. Examples

FIGS. 3A-3F represents displays on touch screen 110 at respective time instances, and illustrate some of the features of the present disclosure, as described below.

Figure 3A:
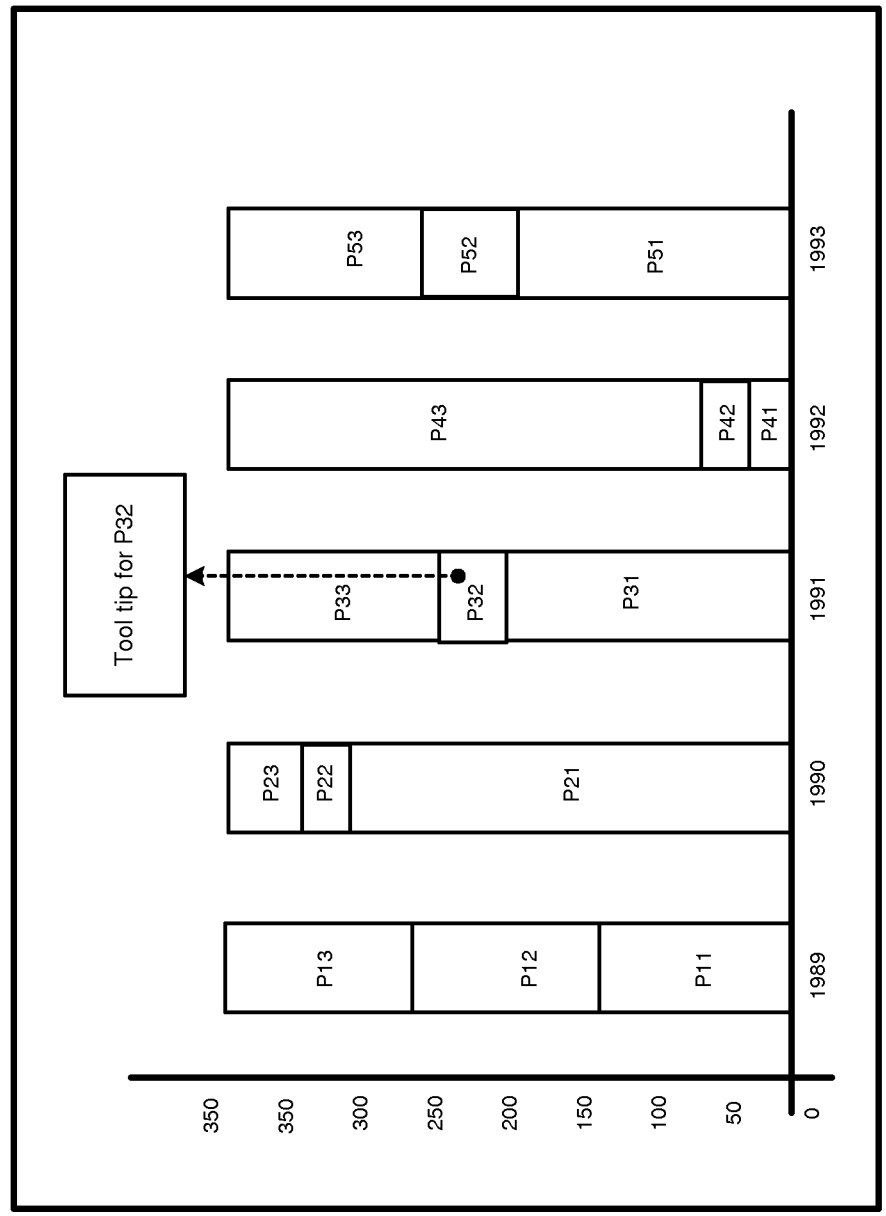
Figure 3B:
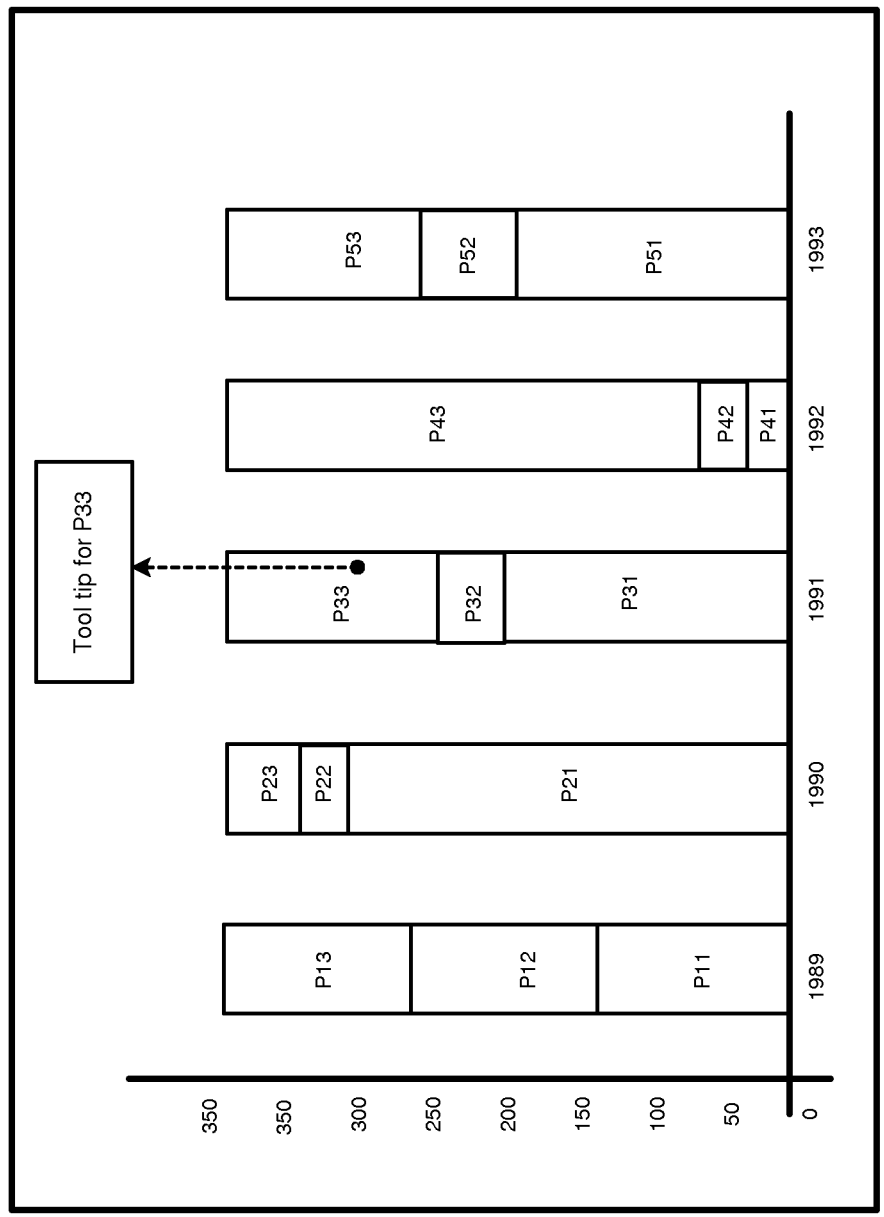
Figure 3C:
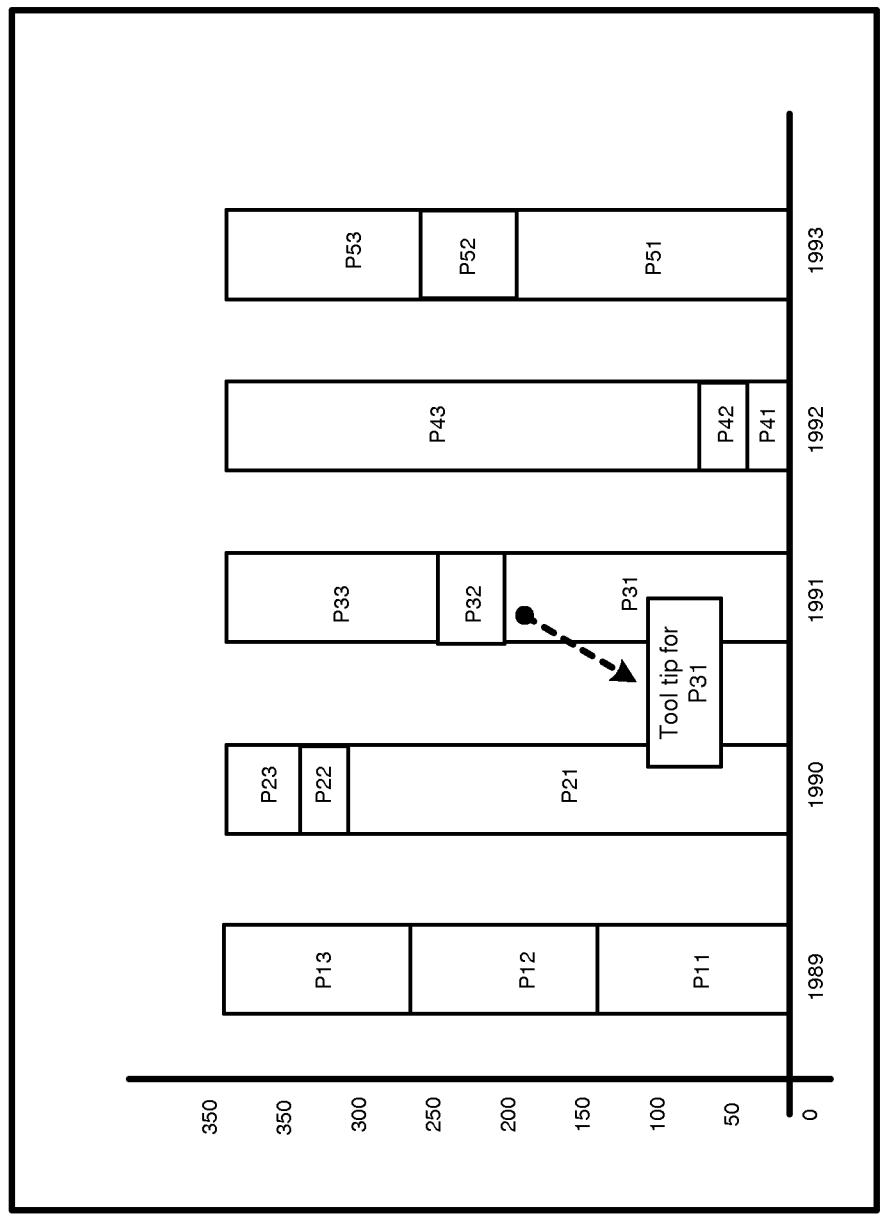

FIG. 3A depicts the display (on touch screen 110) containing various elements identified in a two dimensional space. There are shown profits (one dimension) from three different segments on Y-axis, and such information is shown for five years (second dimension). The 15 corresponding elements are referred to as P11 . . . P53 (with the first suffix representing the year dimension and the second suffix representing the profit dimension). The Figure is shown having selected (e.g., by tap on area corresponding to P32) the profit based on segment 2 for year 1991 (P32), and the corresponding tooltip information is shown displayed. The tuple here equals (3, 2)

FIGS. 3B, 3C, 3D, 3E respectively show the corresponding change of display after a user has swiped in one up, down, right and left directions (in accordance with the description of FIG. 2B above. The swipe can be using the tooltip box (i.e., dragging the box) of FIG. 3A or in any area (including the blank areas). Up/Down directions indicate desire to continue selection for the same year, but of segments 3/1 (adjacent or next segment) respectively. The left/right directions indicate desire to continue selection for the same segment, but for previous/subsequent (in general, next) years respectively.

Figure 3D:
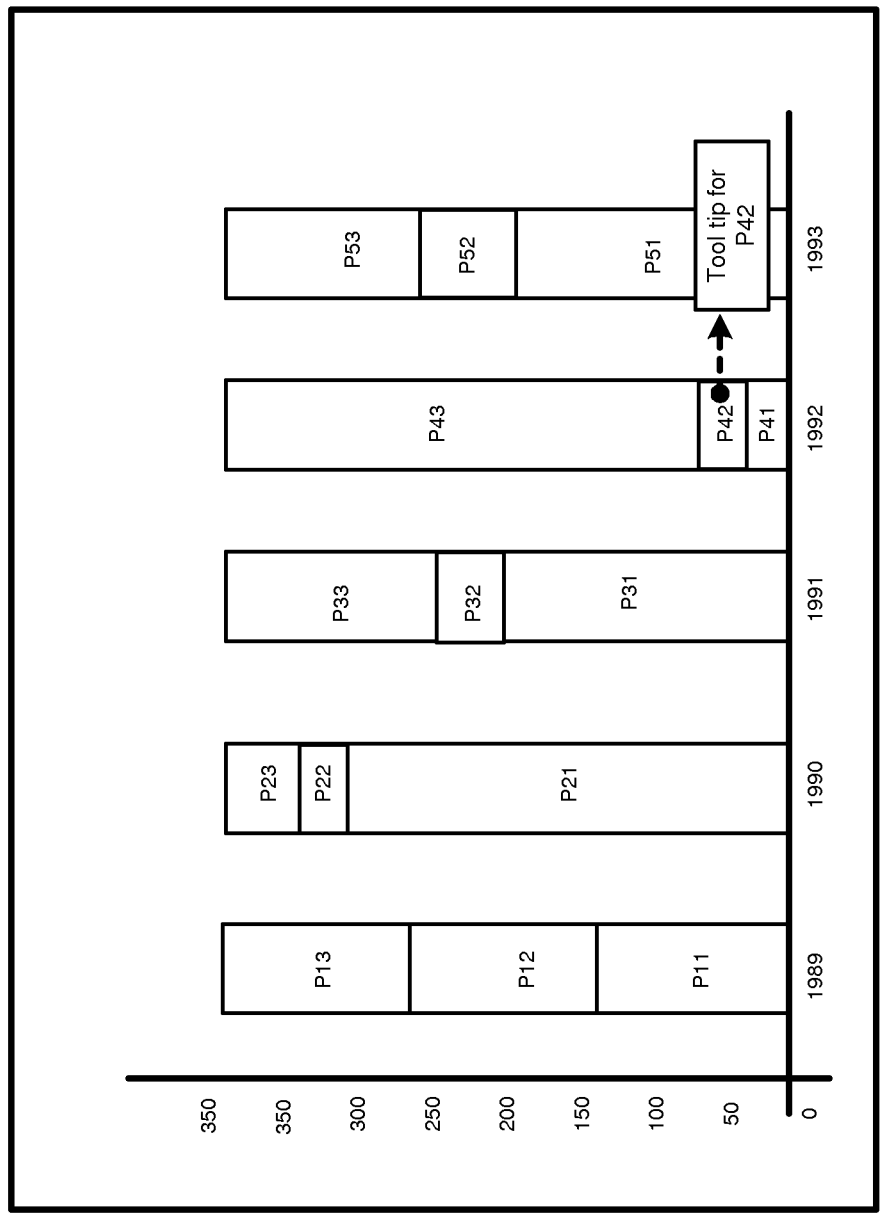

Thus, assuming that a user has swiped on the display corresponding to FIG. 3A, at angle between 315-45 degrees, the user is deemed to have expressed interest in profit for the same second segment, but for a subsequent year. Accordingly, the display of FIG. 3D shows the selection having changed to the profit corresponding to next year 1992, but for the same segment S2. The tuple here equals (4, 2).

Figure 3E:
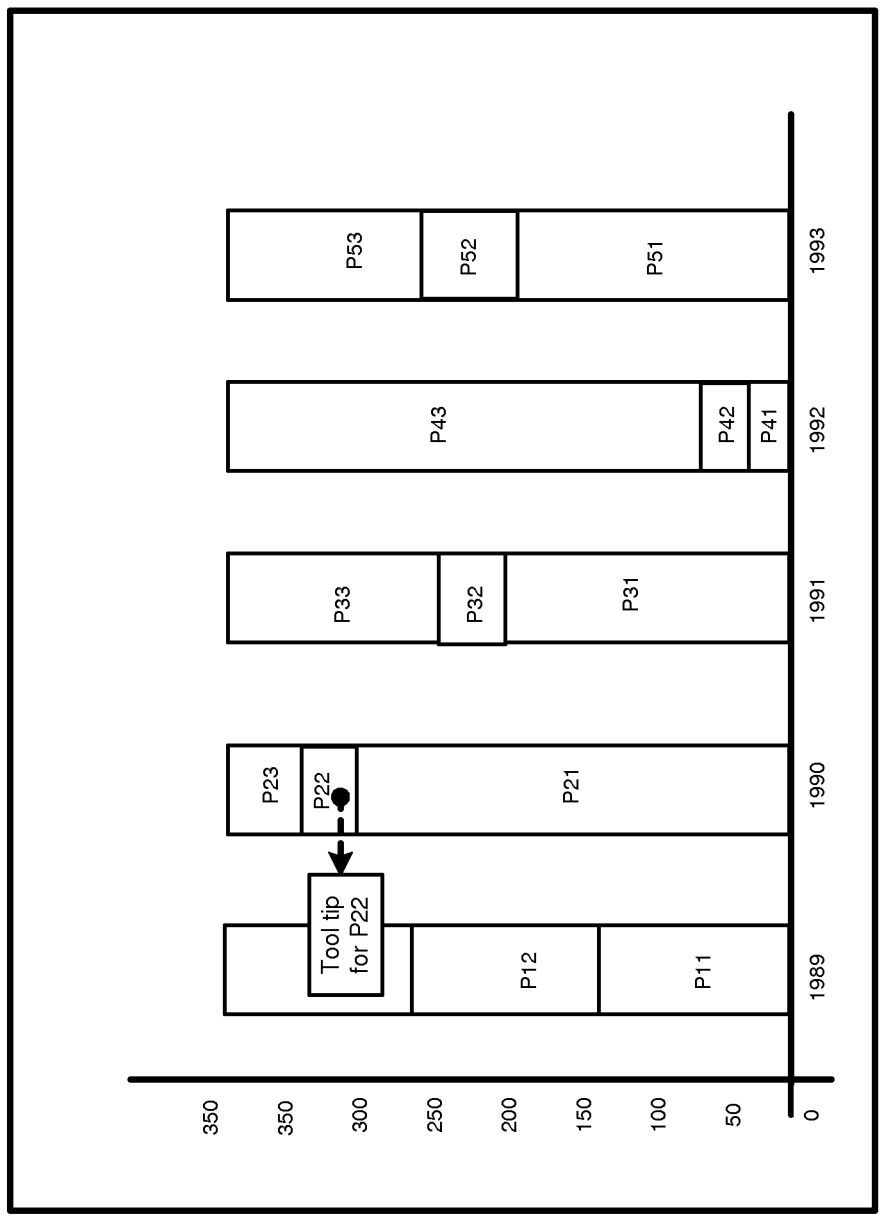

It may be appreciated that P42 is selected on a right swipe (as shown in FIG. 3D), even though P43 is shown to be closer towards the right of P32. Similarly, P22 is selected on a left swipe (as shown in FIG. 3E), even though P21 is shown closer towards the left of P32. It should be appreciated that the swipe operation may correspond to dragging of a tooltip box, and the swipe data represents the extent, direction, etc., of the dragging of the tooltip in an embodiment. According to one approach, it may thus be appreciated that the user is unable to reach any of the other (i.e., except the four noted above) elements from FIG. 3A based on a single swipe operation.

In an alternative approach, the distance of swipe determines the number of elements jumped in the same direction. Thus a longer right swipe may cause element P52 to be selected (instead of P42 for a normal right swipe). In such an embodiment, the swipe vector is first mapped to one of the dimensions/axis (as depicted in FIG. 2A), and the vector component in the mapped dimension determines the end point of the swipe for further examination. As an example, as illustrated in FIG. 3F, a user may have dragged the leaderline there (swiped) for a distance of 5 units (shown by hypotenuse in dotted line), with 4 units along X-axis and 3 units along the Y-axis (shown as horizontal and vertical broken lines). The swipe is pre-dominantly in the X-axis direction, and the end point is deemed to be only 4 units from the previously selected element (e.g., centre thereof).

The next selected element is determined based on the 4 units. The elements of the object array corresponding to the horizontal dimension only may be examined to determine the next selected element. Further, the direction of swipe may be used to further reduce the number of objects examined. According to one approach, objects of successive elements from the previously selected element (i.e., P32) along the horizontal dimension (i.e., segment 2 of different years) may be examined to determine the proximal element.

Assuming a swipe to the right, only objects corresponding to P42 and P52 may be examined to see which of them is most proximal to a (end) point that is 4 units (on the display screen) along the X-axis from the centre of previously selected element P22. Each element may be mapped similarly to the X-axis (i.e., the Y-coordinate ignored) in determining the proximal element. An element may be determined to be a proximal element if the corresponding display portion covers the end point or if the central point of the element is closest to the end point among all the elements in the mapped dimension (X-axis).

In FIG. 3F, element P42 may be determined to be the next selected element, given that the point 391 (end point after dragging of the leaderline) does not fall on any of the elements corresponding to 1992 or 1993, and point 391 is closer to point 392 (centre of P42) than to point 393 (centre of P52) when all points are mapped to X-axis (even though without such mapping to X-axis, point 393 is closer than point 392).

It may be accordingly appreciated that the user is able to navigate only along the dimensions/axis in both the embodiments. Such a constraint offers more predictability in selection of elements, and can be particularly useful in densely populated segments.

Furthermore, the tool tip persists even after a user lifts her/his finger from first selection of FIG. 3A (if the swipe is to be based on dragging the tooltip box). Irrespective, the selection of an element may persist once a user selects the element.

The description is continued with respect to the manner in which touch system 101 can be implemented in several embodiments.

5. Touch System

Figure 4:
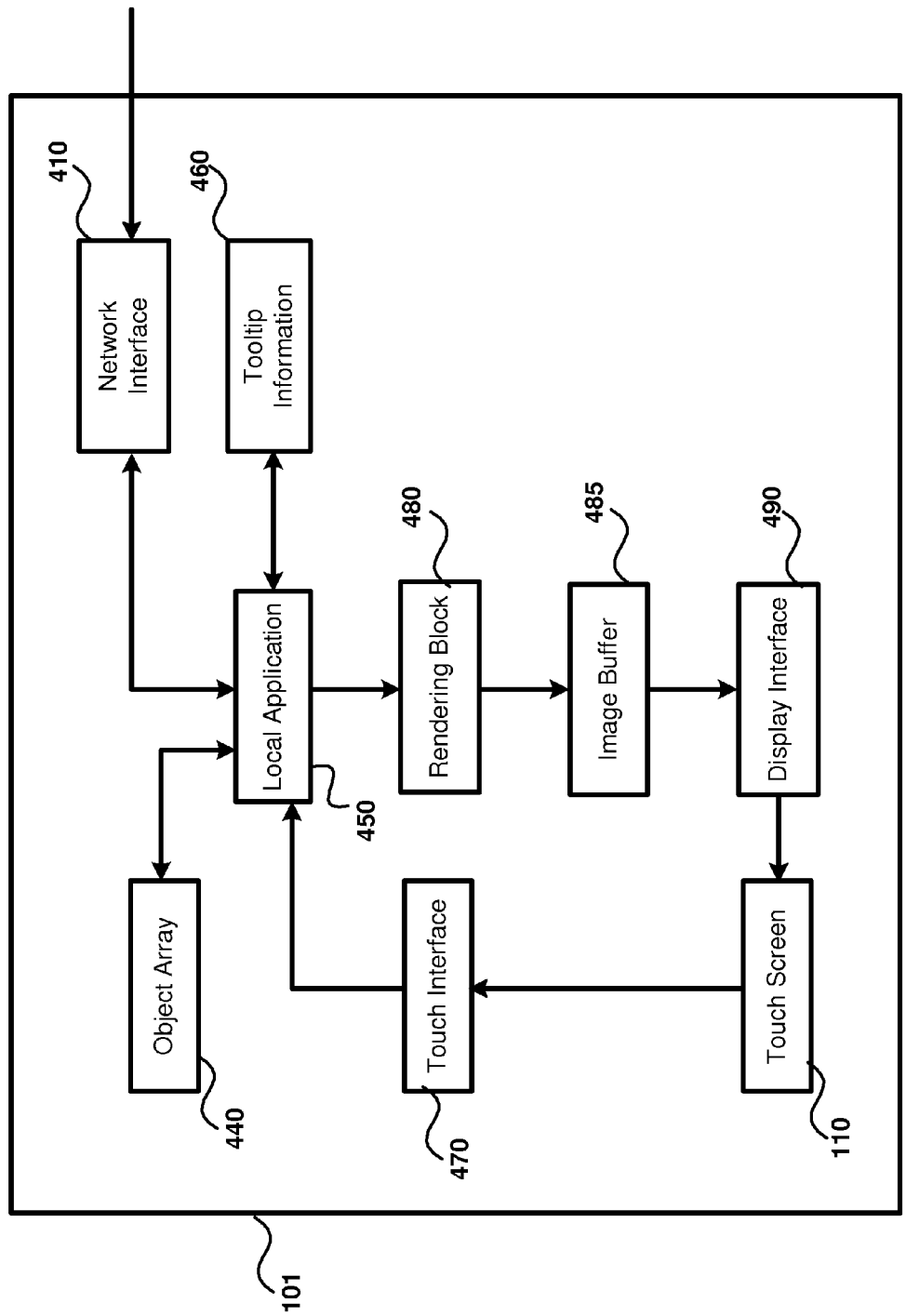
FIG. 4 is a block diagram illustrating the details of a digital processing system in an embodiment.

FIG. 4 is a block diagram illustrating the details of touch system 101 in an embodiment. Touch system is shown containing network interface 410, tooltip information 460, local application 450, object array 440, touch interface 470, rendering block 480, image buffer 485, and display interface 490.

Network interface 410 provides the connectivity with server system 103 to receive data representing various elements and any corresponding tooltip information (for networked applications). The received data is provided to local application 450. In case of stand-alone application such information may be integral to the application being executed.

Touch interface 470 provides information characterizing various touch operations on touch screen 110. For example, the received data may indicate whether a single point/area was touched, multiple pointers were touched simultaneously, and the coordinates of such one or more touches. The data thus received forms the basis for determining whether a user has intended a single touch/tap, swipe (including drag), pinch, etc., touch operations on touch screen 110. In an embodiment, for each touch/tap operation, coordinate data representing a centre point of the touch (touch point) is provided.

Tooltip information 460 contains tooltips defined for each of the elements (and received from server system 103). Though shown as a separate block, the information can be integrated into object array.

Object array 440 contains objects, having information related to each of the (visual) elements. Assuming all the elements are displayed (as shown in FIGS. 3A-3E), the number of displayed elements equals the number of objects. The objects may be stored in a random access memory (RAM). The array may have the same number of dimensions as the elements are organized as. Thus, in case of FIGS. 3A-3E, the object array may be organized as a 5×3 array (step 210).

Each object may include information indicating the size, shape, location etc., of the corresponding element. In an embodiment, the information included for each object includes bottomY (the lowest point along the Y-axis), centerX (the X-coordinate of the centre of the object), centerY, leftX (the X-coordinate of the left most point of the element), rightX. As may be readily appreciated, such information can be used to determine the next selected element (in response to a swipe) in accordance with the various approaches described above.

Rendering block 480 may receive data representing the list of elements (e.g., tooltip box, leader line, cursor/mouse pointers) to be displayed (e.g., characterized by shape and location to define the complete image for the element) along with the raster image from local application 450, and generate a composite image of all the elements and the raster image. The composite image (e.g., in RGB format) is stored in image buffer 485. Display interface 490 generates display signals which cause the corresponding image to be displayed on touch screen 110. Touch interface 470, rendering block 480, image buffer 485, display interface 490 and touch screen 110 may be implemented in a known way.

Local application 450 represents a client side portion of a networked application (e.g., browser) or a stand-alone application. In case of standalone application, the elements and corresponding information may be formed/created locally upon execution of the corresponding instructions. In case of networked applications, data corresponding to various elements is received from server system 103 via network interface 410. Local application 450 processes the data and populates object array 440 and tooltip information 460 based on the received information.

Upon receiving indication of a touch/tap operation (e.g., with the centre of the touch area received as a parameter value), local application 450 first determines the specific one of the elements in object array 440, which has a display area overlapping with the tap point received as a parameter (upon touch operation). Assuming such an element is found, the corresponding element is determined as the desired/selected element (step 215). Alternatively, the shared environment (browser, operating system) may provide identity of the selected element, based on the HTML data representing the image (received from server system 103). Local application 450 maintains an ordered tuple (here 2 tuple) representing the presently selected element. In case of FIG. 3A, the tuple equals (3, 2) (step 220).

Local application 450 forms another element (or elements) representing the leader line and tooltip box upon selection of an element. The tooltip corresponding to the selected element is retrieved from object array 440, and incorporated into the tooltip box. The leader line is defined to point to the element selected by the user. The combination of tooltip box and leaderline are sent for display on the raster image, to cause the display of FIG. 3A to be generated.

The user may alter the element selection again in accordance with step 230 of FIG. 2A, and FIGS. 3B-3E. Local application 450 determines the next selected element in accordance with steps 240-260, and the approaches described above. Due to the use of the array and the constraints in permitting movement along the horizontal or vertical directions only (in case of 2 dimensional arrays), the next selected element can be easily determined Local application 450 accordingly accesses the tooltip information corresponding to the selected element from object array 440, and incorporates the retrieved information into the tooltip box. The display on touch screen 110 are accordingly updated (FIGS. 3B-3E), for the tool tip to map to the newly selected element. Thus, the user may be permitted to select desired elements successively, while the desired information for each selected object is conveniently retrieved.

It should be further appreciated that the features described above can be implemented in various embodiments as a desired combination of one or more of hardware, software, and firmware. The description is continued with respect to an embodiment in which various features are operative when the software instructions described above are executed.

7. Digital Processing System

Figure 5:
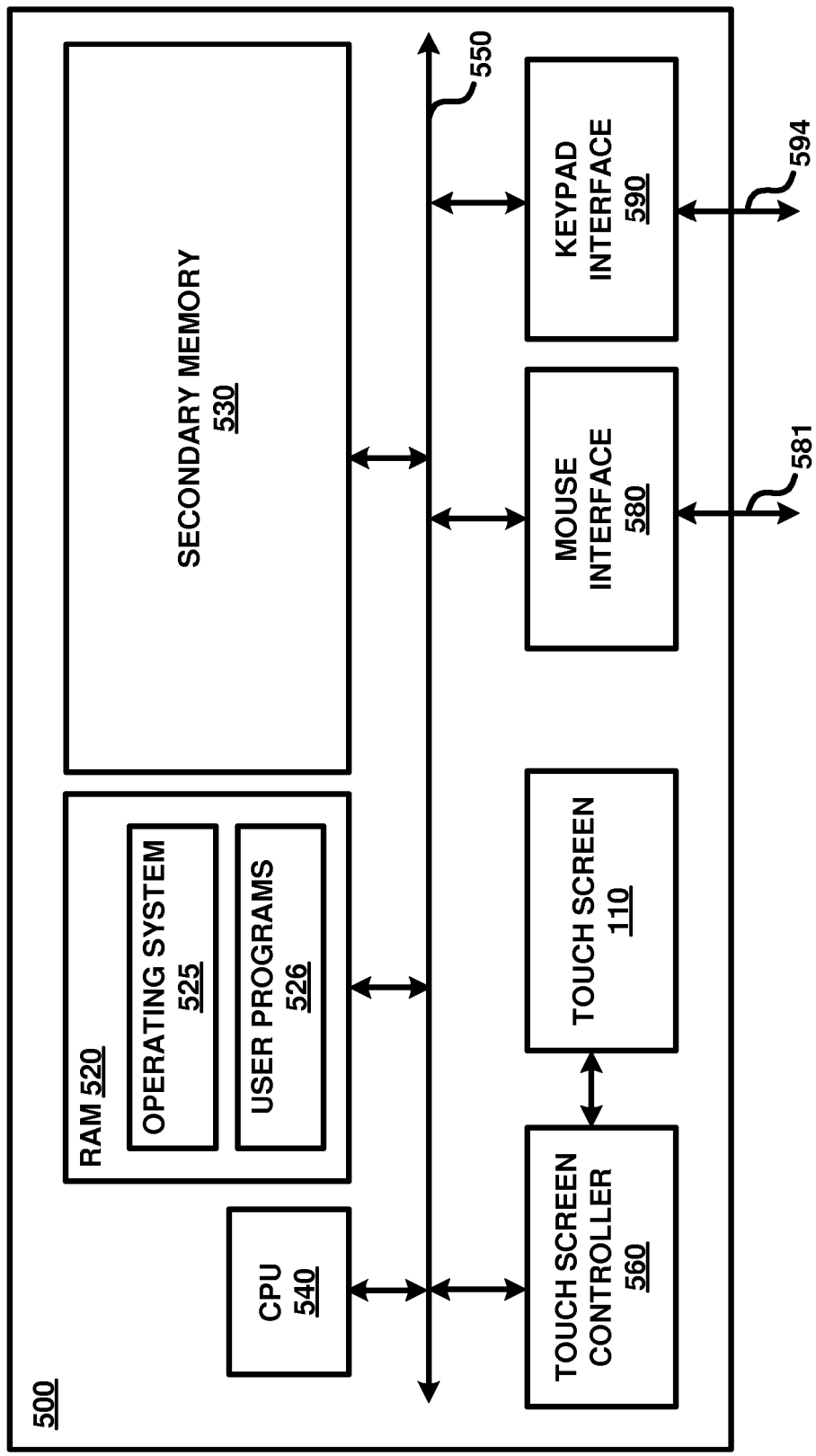
FIG. 5 is a block diagram illustrating the details of a digital processing system in which various aspects of the present disclosure are operative by execution of appropriate software instructions.

FIG. 5 is a block diagram illustrating the details of an example special purpose computing system in which several aspects of the present disclosure can be implemented. Special purpose computing system (System) 500 (corresponding to touch system 101) is shown containing central processing unit (CPU) 510, random access memory (RAM) 520, secondary memory 530, touch screen controller 560, touch screen 110, mouse interface 580 and keypad interface 590. All the components except touch screen 110 may communicate with each other over communication path 550, which may contain several buses as is well known in the relevant arts.

CPU 510 may execute instructions stored in RAM 520 to provide various features of system 500. Thus, for example, when system 500 corresponds to a PDA, the operation of CPU 510 may enable a user to use one or more of many user applications stored in the PDA and executable by CPU 510. The applications may include, for example, word processors, web browsers, email client, data organizers such as address books, etc. CPU 510 may contain multiple processors, with each processor potentially being designed for a specific task. Alternatively, CPU 510 may contain only a single general-purpose processor. Such combination of one or more processors may be generally referred to as a processing unit.

RAM 520 may receive instructions from secondary memory 530 using communication path 550, in addition to storing the object array and the ordered tuple indicating the presently selected element. RAM 520 is shown currently containing software instructions constituting shared environment (operating system) 525 and user programs 526. Shared environment 525 contains utilities shared by user programs 526, and such shared utilities include operating system, device drivers, etc., which provide a (common) run-time environment for execution of user programs/applications. User programs 526 may include applications such as word processing, email client, etc., (or local application 450) noted above. One or more of user programs 526 may be designed to interact with a user via a graphical user interface (GUI) presented on touch screen 110, described above with respect to FIGS. 3A-3E.

Secondary memory 530 represents a non-transitory machine readable storage medium, and may store data and software instructions (for example, for performing the steps of the flowchart of FIG. 2A, described above), which enables system 500 to provide several features in accordance with the present disclosure. Further, secondary memory 530 may store data representing the objects, the information displayed in FIGS. 3A-3E etc. The code/instructions stored in secondary memory 530 may either be copied to RAM prior to execution by CPU 510 for higher execution speeds, or may be directly executed by CPU 510.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as secondary memory 530. Volatile media includes dynamic memory, such as RAM 520. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 550. Transmission media can also take the form of acoustic or light waves, such as those generated during radio-wave and infra-red data communications.

Mouse interface 580 enables user-inputs to be provided to system 500 via a mouse (not shown) connected on path 581. Keypad interface 590 is connected to a keypad (not shown) via path 594, and enables user-inputs to be provided to system 500 via a keypad.

Touch screen controller 560 generates display signals (e.g., in RGB format) to cause corresponding text or images (for example, in the form of a GUI) to be displayed on touch screen 110. Touch screen controller 560 receives touch signals generated by touch screen 110, in response to touch/pressure (in general, the touch operations) applied on touch screen 110. Touch screen controller 560 may process such touch signals and generate digital data representing the touch signals.

The generated digital data is passed to appropriate execution entities via the shared environment 525. For example, if a touch operation is performed with respect to a visual element controlled by a user application, the digital data is eventually delivered to the user application.

Touch screen 110 displays text/images, etc, defined by the display signals received from touch screen controller 560. Thus, touch screen 110 may display a GUI generated by an application executed by CPU 510. Touch screen 110 generates touch signals in response to touch operations using finger (s) or stylus, etc., with respect to a corresponding portion (for example a visual element) of touch screen 110. Touch screen controller 560 and touch screen 110 may be implemented in a known way.

In this document, the term "computer program product" is used to generally refer to removable storage unit or hard disk installed in a hard drive. These computer program products are means for providing software to digital processing system 500. CPU 510 may retrieve the software instructions, and execute the instructions to provide various features of the present disclosure described above.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

7. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method implemented in a touch screen based system, the method comprising:

storing a plurality of objects as a multi-dimensional array in a memory of said touch screen based system, each of said plurality of objects storing information of a respective element of a plurality of elements;

sending said plurality of elements for display on a touch screen, said plurality of elements being organized for display in a same number of dimensions as said multi-dimensional array;

receiving data indicating selection of a first element of said plurality of elements;

receiving data representing a swipe action after said selection;

in response to said swipe action, determining a next selected element, said determining comprising:

mapping the swipe action to one of the dimensions based on a direction of the swipe action with respect to organization of said plurality of elements in the display;

selecting as said next selected element from only the objects along said mapped dimension in relation to said first element; and updating the display on said touch screen to indicate said next selected element, wherein said next selected element is limited to be only one of the elements sharing at least one of the dimensions with said first element.

2. The method of claim 1, wherein said same number equals 2, wherein said plurality of elements are displayed as a graph having an X-axis and a Y-axis, wherein elements with a same value for a second dimension being displayed disposed along said X-axis, and elements with a same value for a first dimension being displayed disposed along said Y-axis, wherein said mapping maps said swipe action to said second dimension if said direction is more along said X-axis than said Y-axis such said next selected element is one of only the elements having the same value for said second dimension as said first element, wherein said mapping maps said swipe action to said first dimension if said direction is more along said Y-axis than said X-axis such said next selected element is one of only the elements having the same value for said first dimension as said first element.

3. The method of claim 2, wherein said mapping also computes an end position of said swipe action along the mapped dimension, wherein said selecting selects a proximal element to said end position as said next selected element, wherein said proximal element is one of the elements along said mapped dimension.

4. The method of claim 3, further comprising setting the components of an ordered tuple to equal the index values of the selected element in said multi-dimensional array, wherein said ordered tuple identifies a currently selected element on said display.

5. The method of claim 4, wherein each of said plurality of objects stores coordinates representing the boundaries of display of the corresponding element, wherein said selection of proximal element comprises:

changing the component corresponding to the mapped dimension to different values; and accessing corresponding objects of said plurality of objects with said components of said tuple used as index values into said multi-dimensional array, wherein said coordinates of each accessed object are examined for said selection, wherein only objects having the same value as that of said first element for the mapped dimension are accessed for said selection.

6. The method of claim 5, wherein if no element covers a display area containing said end position, an element along said dimension having a centre closest to said end position is selected as said proximal element.

7. A non-transitory machine readable medium storing one or more sequences of instructions for causing a touch system to facilitate selection of elements displayed on a touch screen contained in said touch system, wherein execution of said one or more sequences of instructions by one or more processors contained in said touch system causes said touch system to perform the actions of:

storing a plurality of objects as a multi-dimensional array in a memory of said touch system, each of said plurality of objects storing information of a respective element of a plurality of elements;

sending said plurality of elements for display on said touch screen, said plurality of elements being organized for display in a same number of dimensions as said multi-dimensional array;

receiving data indicating selection of a first element of said plurality of elements;

receiving data representing a swipe action after said selection;

in response to said swipe action, determining a next selected element, said determining comprising:

mapping the swipe action to one of the dimensions based on a direction of the swipe action with respect to organization of said plurality of elements in the display;

selecting as said next selected element from only the objects along said mapped dimension in relation to said first element; and updating the display on said touch screen to indicate said next selected element, wherein said next selected element is limited to be only one of the elements sharing at least one of the dimensions with said first element.

8. The non-transitory machine readable medium of claim 7, wherein said same number equals 2, wherein said plurality of elements are displayed as a graph having an X-axis and a Y-axis, wherein elements with a same value for a second dimension being displayed disposed along said X-axis, and elements with a same value for a first dimension being displayed disposed along said Y-axis, wherein said mapping maps said swipe action to said second dimension if said direction is more along said X-axis than said Y-axis such said next selected element is one of only the elements having the same value for said second dimension as said first element, wherein said mapping maps said swipe action to said first dimension if said direction is more along said Y-axis than said X-axis such said next selected element is one of only the elements having the same value for said first dimension as said first element.

9. The non-transitory machine readable medium of claim 8, wherein said mapping also computes an end position of said swipe action along the mapped dimension, wherein said selecting selects a proximal element to said end position as said next selected element, wherein said proximal element is one of the elements along said mapped dimension.

10. The non-transitory machine readable medium of claim 9, further comprising setting the components of an ordered tuple to equal the index values of the selected element in said multi-dimensional array, wherein said ordered tuple identifies a currently selected element on said display.

11. The non-transitory machine readable medium of claim 10, wherein each of said plurality of objects stores coordinates representing the boundaries of display of the corresponding element, wherein said selection of proximal element comprises:
    changing the component corresponding to the mapped dimension to different values; and
    accessing corresponding objects of said plurality of objects with said components of said tuple used as index values into said multi-dimensional array,
    wherein said coordinates of each accessed object are examined for said selection,
    wherein only objects having the same value as that of said first element for the mapped dimension are accessed for said selection.

12. The non-transitory machine readable medium of claim 11, wherein if no element covers a display area containing said end position, an element along said dimension having a centre closest to said end position is selected as said proximal element.

13. A digital processing system comprising:
    a touch screen;
    a memory to store instructions;
    a processing unit to retrieve instructions from said memory an execute the retrieved instructions, wherein execution of said retrieved instructions causes said digital processing system to perform the actions of:
        storing a plurality of objects as a multi-dimensional array in said memory, each of said plurality of objects storing information of a respective element of a plurality of elements;
        sending said plurality of elements for display on said touch screen, said plurality of elements being organized for display in a same number of dimensions as said multi-dimensional array;
        receiving data indicating selection of a first element of said plurality of elements;
        receiving data representing a swipe action after said selection;
        in response to said swipe action, determining a next selected element, said determining comprising:
            mapping the swipe action to one of the dimensions based on a direction of the swipe action with respect to organization of said plurality of elements in the display;
            selecting as said next selected element from only the objects along said mapped dimension in relation to said first element; and
        updating the display on said touch screen to indicate said next selected element,
    wherein said next selected element is limited to be only one of the elements sharing at least one of the dimensions with said first element.

14. The digital processing system of claim 13,
    wherein said same number equals 2, wherein said plurality of elements are displayed as a graph having an X-axis and a Y-axis,
    wherein elements with a same value for a second dimension being displayed disposed along said X-axis, and elements with a same value for a first dimension being displayed disposed along said Y-axis,
    wherein said mapping maps said swipe action to said second dimension if said direction is more along said X-axis than said Y-axis such said next selected element is one of only the elements having the same value for said second dimension as said first element,
    wherein said mapping maps said swipe action to said first dimension if said direction is more along said Y-axis than said X-axis such said next selected element is one of only the elements having the same value for said first dimension as said first element.

15. The digital processing system of claim 14, wherein said mapping also computes an end position of said swipe action along the mapped dimension,
    wherein said selecting selects a proximal element to said end position as said next selected element, wherein said proximal element is one of the elements along said mapped dimension.

16. The digital processing system of claim 15, further comprising setting the components of an ordered tuple to equal the index values of the selected element in said multi-dimensional array, wherein said ordered tuple identifies a currently selected element on said display.

17. The digital processing system of claim 16, wherein each of said plurality of objects stores coordinates representing the boundaries of display of the corresponding element, wherein said selection of proximal element comprises:
    changing the component corresponding to the mapped dimension to different values; and
    accessing corresponding objects of said plurality of objects with said components of said tuple used as index values into said multi-dimensional array,
    wherein said coordinates of each accessed object are examined for said selection,
    wherein only objects having the same value as that of said first element for the mapped dimension are accessed for said selection.

18. The digital processing system of claim 17, wherein if no element covers a display area containing said end position, an element along said dimension having a centre closest to said end position is selected as said proximal element.

* * * * *